US008553093B2

(12) United States Patent
Wong et al.

(10) Patent No.: US 8,553,093 B2
(45) Date of Patent: Oct. 8, 2013

(54) METHOD AND APPARATUS FOR SUPER-RESOLUTION IMAGING USING DIGITAL IMAGING DEVICES

(75) Inventors: Earl Quong Wong, San Jose, CA (US); Yoshihiro Murakami, Atsugi (JP); Pingshan Li, Sunnyvale, CA (US); Eric D. Edwards, Kealakekua, HI (US); Soroj Triteyaprasert, Bangkok (TH); Hidenori Kushida, Yokohama (JP); Makibi Nakamura, Tokyo (JP); Mamoru Sugiura, Kanagawa (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 780 days.

(21) Appl. No.: 12/242,809

(22) Filed: Sep. 30, 2008

(65) Prior Publication Data
US 2010/0079608 A1 Apr. 1, 2010

(51) Int. Cl.
H04N 5/228 (2006.01)

(52) U.S. Cl.
USPC .................................. 348/208.13; 348/222.1

(58) Field of Classification Search
USPC .................................................... 348/208.13
See application file for complete search history.

(56) References Cited

U.S. PATENT DOCUMENTS

| 4,349,254 | A | 9/1982 | Jyojk et al. |
| 4,751,570 | A | 6/1988 | Robinson |
| 4,965,840 | A | 10/1990 | Subbarao |
| 5,148,209 | A | 9/1992 | Subbarao |
| 5,170,202 | A | 12/1992 | Bell |
| 5,212,516 | A | 5/1993 | Yamada et al. |
| 5,231,443 | A | 7/1993 | Subbarao |
| 5,365,597 | A | 11/1994 | Holeva |
| 5,432,331 | A | 7/1995 | Wertheimer |
| 5,534,924 | A | 7/1996 | Florant |
| 5,577,130 | A | 11/1996 | Wu |
| 5,604,537 | A | 2/1997 | Yamazaki et al. |
| 5,696,848 | A | 12/1997 | Patti et al. |
| 5,703,637 | A | 12/1997 | Miyazaki et al. |
| 5,705,803 | A | 1/1998 | Lisson et al. |
| 5,752,100 | A | 5/1998 | Schrock |
| 5,793,900 | A | 8/1998 | Nourbakhsh et al. |

(Continued)

FOREIGN PATENT DOCUMENTS

| JP | 8329875 A | 12/1996 |
| JP | 10108152 | 4/1998 |

(Continued)

OTHER PUBLICATIONS

Chiang, Ming-Chao and Boult, Terrance E., "Local Blur Estimation and Super Resolution," 1997 IEEE CVPR Proceedings, 6 pages.

(Continued)

Primary Examiner — Tuan Ho
Assistant Examiner — Angel L Garces-Rivera
(74) Attorney, Agent, or Firm — Blakely, Sokoloff, Taylor & Zafman LLP

(57) ABSTRACT

A super-resolution image is generated from a sequence of low resolution images. In one embodiment, the image shift information is measured for each of the low resolution images using an image stabilization component of an imaging device. The shift information is used to generate the super-resolution image. In another embodiment, the blurs are calculated for each of the low resolution images and are used to generate the super-resolution image.

20 Claims, 8 Drawing Sheets

(56) References Cited

U.S. PATENT DOCUMENTS

| | | | |
|---|---|---|---|
| 6,023,056 | A | 2/2000 | Fiete et al. |
| 6,130,417 | A | 10/2000 | Hashimoto |
| 6,177,952 | B1 | 1/2001 | Tabata et al. |
| 6,219,461 | B1 | 4/2001 | Wallack |
| 6,229,913 | B1 | 5/2001 | Nayar et al. |
| 6,268,863 | B1 | 7/2001 | Rioux |
| 6,456,737 | B1 | 9/2002 | Woodfill et al. |
| 6,504,571 | B1 | 1/2003 | Narayanaswami et al. |
| 6,650,704 | B1 | 11/2003 | Carlson et al. |
| 6,677,948 | B1 | 1/2004 | Wasserman et al. |
| 6,683,652 | B1 | 1/2004 | Ohkawara et al. |
| 6,829,383 | B1 | 12/2004 | Berestov |
| 6,876,776 | B2 | 4/2005 | Recht |
| 6,891,966 | B2 | 5/2005 | Chen |
| 6,925,210 | B2 | 8/2005 | Herf |
| 7,019,780 | B1 | 3/2006 | Takeuchi et al. |
| 7,035,451 | B2 | 4/2006 | Harman et al. |
| 7,187,413 | B2 | 3/2007 | Alderson |
| 7,303,131 | B2 | 12/2007 | Carlson et al. |
| 7,340,077 | B2 | 3/2008 | Goturk et al. |
| 7,359,576 | B1 | 4/2008 | Worthington et al. |
| 7,409,103 | B2 | 8/2008 | Nishi et al. |
| 7,471,330 | B2 | 12/2008 | Okawara |
| 7,616,254 | B2 | 11/2009 | Wong et al. |
| 7,616,826 | B2 | 11/2009 | Freeman et al. |
| 7,657,119 | B1 | 2/2010 | Georgiev et al. |
| 7,711,201 | B2 | 5/2010 | Wong et al. |
| 7,801,428 | B2 | 9/2010 | Nagaishi et al. |
| 7,880,800 | B2 | 2/2011 | Sasaki et al. |
| 7,929,801 | B2 | 4/2011 | Nakamura et al. |
| 7,941,002 | B2 | 5/2011 | Samadani et al. |
| 7,941,042 | B2 | 5/2011 | Park et al. |
| 2003/0067536 | A1 | 4/2003 | Boulanger et al. |
| 2003/0231792 | A1 | 12/2003 | Zhang et al. |
| 2004/0008269 | A1* | 1/2004 | Zomet et al. ............ 348/252 |
| 2004/0027450 | A1 | 2/2004 | Yoshino |
| 2004/0036763 | A1 | 2/2004 | Swift et al. |
| 2004/0125228 | A1 | 7/2004 | Dougherty |
| 2004/0131348 | A1 | 7/2004 | Ohba et al. |
| 2004/0196379 | A1 | 10/2004 | Chen et al. |
| 2004/0252906 | A1 | 12/2004 | Liege et al. |
| 2005/0019000 | A1 | 1/2005 | Lim et al. |
| 2005/0104969 | A1 | 5/2005 | Schoelkopf et al. |
| 2005/0105823 | A1 | 5/2005 | Aoki |
| 2005/0220358 | A1 | 10/2005 | Blonde et al. |
| 2005/0265580 | A1 | 12/2005 | Antonucci et al. |
| 2006/0038891 | A1 | 2/2006 | Okutomi et al. |
| 2006/0120706 | A1 | 6/2006 | Cho et al. |
| 2006/0221179 | A1 | 10/2006 | Seo et al. |
| 2006/0256229 | A1 | 11/2006 | Wernersson |
| 2006/0285741 | A1 | 12/2006 | Subbarao |
| 2006/0285832 | A1 | 12/2006 | Huang |
| 2007/0014468 | A1 | 1/2007 | Gines et al. |
| 2007/0019883 | A1 | 1/2007 | Wong et al. |
| 2007/0036427 | A1 | 2/2007 | Nakamura et al. |
| 2007/0040924 | A1 | 2/2007 | Cho et al. |
| 2007/0189750 | A1 | 8/2007 | Wong et al. |
| 2007/0216765 | A1 | 9/2007 | Wong et al. |
| 2007/0297784 | A1 | 12/2007 | Wong et al. |
| 2008/0007626 | A1 | 1/2008 | Wernersson |
| 2008/0080846 | A1 | 4/2008 | Grip |
| 2008/0089598 | A1 | 4/2008 | George et al. |
| 2008/0107411 | A1 | 5/2008 | Hope |
| 2008/0297648 | A1 | 12/2008 | Furuki et al. |
| 2009/0015681 | A1 | 1/2009 | Pipkorn |
| 2009/0074393 | A1 | 3/2009 | Park et al. |
| 2009/0079862 | A1 | 3/2009 | Subbotin |
| 2009/0186655 | A1 | 7/2009 | Wernersson |
| 2009/0268985 | A1 | 10/2009 | Wong et al. |
| 2009/0316995 | A1 | 12/2009 | Szeliski et al. |
| 2010/0053417 | A1 | 3/2010 | Baxansky |
| 2010/0080482 | A1 | 4/2010 | Wong et al. |
| 2010/0194971 | A1 | 8/2010 | Li et al. |

FOREIGN PATENT DOCUMENTS

| | | |
|---|---|---|
| JP | 2002010126 A2 | 1/2002 |
| JP | 2004048644 | 12/2004 |
| TW | 233523 B | 6/2005 |
| WO | WO 02/098128 A1 | 12/2002 |
| WO | WO 2007/022329 A2 | 2/2007 |
| WO | WO 2007057808 A1 | 5/2007 |
| WO | WO 2007147999 A1 | 12/2008 |

OTHER PUBLICATIONS

Huang, Mao-Yu, Tseng, Din-Chang and Liu, Michael S.C., "Wavelet Image Enhancement Based on Teager Energy Operator," IEEE, 2002, pp. 993-996.

Pettersson, Niklas, "Online Stereo Calibration using FPGAs", http://nice.se/publications/pettersson thesis 2005.pdf, 2005, pp. 1-6.

Ghita, Ovidiu and Whelan, Paul, "Real-Time 3D Estimation Using Depth from Defocus", www.vsq.dcu.ie/papers/vision 2000.pdf, 2000, Third Quarter, vol. 16, No. 3, pp. 1-6.

Alex Paul Pentland, "A New Sense for Depth of Field", 1987, pp. 1-15, IEEE.

Shang-Hong Lai, Chang-Wu Fu and Shyang Chang, "A Generalized Depth Estimation Algorithm with a Single Image", 1992, pp. 405-411, IEEE.

John Ens and Peter Lawrence, "An Investigation of Methods for Determining Depth from Focus", 1993, pp. 97-108, IEEE.

Gopal Surya and Murali Subbarao, "Depth from Defocus by Changing Camera Aperture: A Spatial Domain Approach", 1993, pp. 61-67, IEEE.

Mats Gokstorp, "Computing depth from out-of-focus blur using a local frequency representation", 1994, pp. 153-158, IEEE.

Gunther Schneider, Bernard Heit, Johannes Honig, and Jacques Bremont, "Monocular Depth Perception by Evaluation of the Blur in Defocused Images", 1994, pp. 116-119, IEEE.

Murali Subbarao, Tse-Chung Wei, and Gopal Surya, "Focused Image Recovery from Two Defocused Images Recorded with Different Camera Settings", 1995, pp. 1613-1628, IEEE.

Shree K. Nayar, Masahiro Watanabe and Minori Noguchi, Real-Time Focus Range Sensor, 1996, pp. 1186-1198.

Masahiro Watanabe and Shree K. Nayar, "Minimal Operator Set for Passive Depth from Defocus", 1996, pp. 431-438, IEEE.

Johannes Honig, Bernard Heit and Jacques Bremont, "Visual Depth Perception Based on Optical Blur", 1996, pp. 721-724, IEEE.

A.N. Rajagopalan and S. Chaudhuri, "A Variational Approach to Recovering Depth From Defocused Images", 1997, pp. 1158-1164, IEEE.

D. Ziou, S. Wang and J. Vaillancourt, "Depth from Defocus Using the Hermite Transform", 1998, pp. 958-962, IEEE.

Christophe Simon and Frederique Bicking, "Estimation of depth on thick edges from sharp and blurred images", 2002, pp. 323-328, IEEE.

Ovidiu Ghita, Paul F. Whelan and John Mallon, "Computational approach for depth from defocus", Apr.-Jun. 2005 pp. 023021-1-023021-8, vol. 14(2), Journal of Electronic Imaging.

Tony Lindeberg, "On the axiomatic foundations of linear scale-space: Combining semi-group structure with causality vs. scale invariance", pp. 1-24, 1994, Computational Vision and Action Perception Laboratory (CVAP), Klumer Academic,Sweden.

B.P. Horn, "Robot Vision", 1986, pp. 18-28, MIT Press, New York,McGraw-Hill.

Yalin Xiong, Steven A. Shafer, "Depth from Focusing and Defocusing", 1993, pp. 68-73, IEEE, Pittsburgh, PA.

Kang-Sun Choi, Jun-Suk Lee and Sung-Jae Ko, "New AutoFocusing Technique Using the Frequency Selective Weighted Median Filter for Video Cameras", Jun. 28, 1999, pp. 820-827, IEEE, Korea University, Korea.

L. Firestone, K. Cook, K. Culp, N. Talsania, K. Preston Jr., "Comparison of autofocus methods for automated microscopy", Mar. 13, 2006, pp. 195-206, Department of Electrical and Computer Engineering, Carnegie Mellon University, Pittsburgh, PA.

Jie He, Rongzhen Zhou, Zhiliang Hong, "Modified fast climbing search auto-focus algorithm with adaptive step size searching technique for digital camera", May 2003, pp. 257-262, Consumer Electronics, IEEE Transactions.

Ohba, et al., "Real-Time Micro Environmental Observation With Virtual Reality", 2000, International Conference on Pattern Recognition, vol. 4, pp. 487-490.

Ohba, et al., "Microscopic Vision System With All-In-Focus and Depth Images", Dec. 2003, Machine Vision and Applications, vol. 15, Issue 2, pp. 55-62.

Darrell, et al., "Pyramid Based Depth From Focus", 1988, pp. 504-509.

Blickgesteuerte PC-Steuerung,Forschung&Entwicklung, XP-000725834, Publication Date Aug. 4, 1997, pp. 76-78.

21st Century 3D: 3DVX3 Press Release; 21st Century 3D Introduces Uncompressed 4:4:4 Steroscopic camera System-3DVX3; San Jose Convention Center Jan. 18, 2006 SPIE Steroscopic Displays and Applications conference.

Three-dimensional Camera Phone; Smithsonian/NASA ADS Physics Abstract Service; find Similar Abstracts (with default settings below); Electronic Refereed Journal Article (HTML); Full Refereed Journal Article (PDF/Postscript); Reads History; Translate Abstract; Title: Three-dimensional Camera Phone, Authors: Iizuka, Kiego, Publications: Applied Optics IP, vol. 43, pp. 6285-6292, Publication Date: Dec. 2004, Origin: WEB, Bibliographic Code: 2004ApOpt . . . 43.6285I.

Real-time view interpolation system for a super multiview 3D display; processing; Smithsonian/NASA ADS Physics Abstract Service; find Similar Abstracts (wtih default settings below); Table of Contents; Also-Read Articles (Reads History); Translate Abstract; Title: Real-Time view interpolastion system for a super multiview 3D display; processsing implementation and evalutaion; Authors: Hamaguchi, Tadahiko, Fujii, Toshiaki; Honda, Toshio; Affiliation: AA (Telecommunications Advancement Organization of Japan) AB (Telecommunications Advancement Organization of Japan and Nagoya Univ.) AC (Telecommunications Advancement Organization of Japan and Chiba Univer.); Publication; Proc. SPIE vol. 4660, p. 105-115, Steroscopic Displays and Virtual Reality Systems, IX, Andrew J. Woods; John O. Merritt; Stephen A. Benton; Mark T. Bolas; Eds. (Spie Homepage); Publication Date: May 2002; Origin: SPIE; Abstract Copyright: 2002 SPIE—The Internantion Society for Optical Engineering, Downloading of the abstract is permitted for personal use only; Bibliographic Code: 2002SPIE.4600 . . . 105H.

Klaus Berthold, Paul Horn, "Robot Vision", 1986, pp. 1-509.

Tony Lindeberg, "Scale-Space Theory: A Basic Tool for Analysing Structures At Different Scales", Journal of Applied Statistics, vol. 21, No. 2, pp. 225-270, 1994.

Earl Wong, "A New Method for Creating a Depth Map for Camera Auto Focus Using an All In Focus Picture and 2D Scale Space Matching", Acoustics, Speech and Signal Processing, 2006. ICASSP 2006 Proceedings. 2006 IEEE International Conference on vol. 3, May 14-19, 2006 pp. III-III.

European Patent Office, Extended European Search Report, EP application No. 10 15 0104—counterpart to U.S. Appl. No. 12,363,511, issued May 20, 2010.

U.S. Appl. No. 12/242,805 (not yet published)—filed Sep. 30, 2008—"Fast Camera Auto-Focus".

Yao, Yi, et al.—"Auto-focusing in extreme zoom surveillance: a system approach with application to faces"—Advances in Visual Computing, Second International Symposium, ISVC 2006, Lake Tahoe, NV, USA; Nov. 6-8, 2006.

Ziou, D. et al., "Depth from Defocus Estimation in Spatial Domain", Computer Vision and Image Understanding, vol. 81, No. 2, Feb. 1, 2001. pp. 143-165.

M. Baba et al, "A thin lens based camera model for depth estimation from defocus and translation by zooming.", Proceeding of the 15th International Conference on Vision Interface, Calgary, Canada (2002).

Subbarao et al., "Depth from Defocus: A Spatial Domain Approach", International Journal of Computer Vision, vol. 13, No. 3, pp. 271-294, 1994.

Tsai et al., "A Moment-Preserving Approach for Depth from Defocus", Pattern Recognition, vol. 31, No. 5, pp. 551-560, 1998.

Xian, Tao et al.—"Depth-from-Defocus: Blur Equalization Technique"—Proc. of SPIE, vol. 6382, 2006, pp. 63820E-1-63820E-10.

Deschenes, F. et al.—"Simultaneous Computation of Defocus Blur and Apparent Shifts in Spatial Domain"—15th International Conf. on Vision Interface, May 27-29, 2002, Calgary, Canada.

Leroy, Jean-Vincent et al.—"Real Time Monocular Depth from Defocus"—Lecture Notes in Computer Science, vol. 5099, proc. of the 3rd International conf. on Image and Signal Processing, pp. 103-111, 2008.

Gokstorp, Mark—"Computing depth from out-of-focus blur using a local frequency representation"—Proc. of the 12th IAPR International Conf. on Pattern Recognition, vol. 1, Conf. A: Computer Vision & Image Processing, vol. 1, Oct. 9-13, 1994, Jerusalem.

Park, Soon-Yong—"An image-based calibration technique of spatial domain depth-from-defocus"—Pattern Recognition Letters, vol. 27, 2006, pp. 1318-1324.

Zhang, Quanbing et al.—"A Novel Technique of Image-Based Camera Calibration in Depth-from-Defocus"—First International Conf. on Intelligent Networks and Intelligent Systems, Nov. 1-3, 2008, pp. 483-486.

Lee, S. et al. "Real-time Depth-of-Field Rendering Using Point Splatting on Per-Pixel Layers"—Pacific Graphics, vol. 27, No. 7, pp. 1955-1962, 2008.

Kraus, M. "Quasi-Convolution Pyramidal Blurring"—GRAPP 2008, Proc. of the 3rd Inter. Conf. on Comp. Graphics Theory and Applications, pp. 155-162, Portugal, Jan. 22-25, 2008.

Krivanek. J. et al.—"Fast Depth of Field Rendering with Surface Splatting"—Proceedings from Computer Graphics International 2003.

Yuan, L. et al., "Blurred/Non-Blurred Images Alignment Using Sparseness Prior"—IEEE 11th Int. Conf. on Computer Vision, Oct. 14-17, 2007, Rio de Janeiro, pp. 1-8.

Korean Intellectual Property Office, International Search Report and Written Opinion, counterpart PCT Application No. PCT/US2011/024832, including claims searched, Sep. 22, 2011, pp. 1-14.

European Patent Office, Extended Search Report, Issued on Feb. 24, 2011, including claims searched for corresponding EPO patent application No. 10190445.6, claiming priority to U.S. Appl. No. 12/643,802, pp. 1-10.

* cited by examiner

LR Image
402A

Zoom = A
Focus Position = B1
Sensor Pos = (x,y)

LR Image
402B

Zoom = A
Focus Position = B2
Sensor Pos = (x+\delta x, y)

LR Image
402C

Zoom = A
Focus Position = B2
Sensor Pos = (x+\delta x,
                y+\delta y)

LR Image
402N

Zoom = A
Focus Position = B2
Sensor Pos = (x+\deltaN,
                y+\deltaN)

METHOD AND APPARATUS FOR SUPER-RESOLUTION IMAGING USING DIGITAL IMAGING DEVICES

RELATED APPLICATIONS

This patent application is related to the co-pending U.S. patent application, entitled "METHOD AND APPARATUS FOR GENERATING A DEPTH MAP UTILIZED IN AUTO-FOCUSING", application Ser. No. 11/473,694, filed Jun. 6, 2006 and "REDUCED HARDWARE IMPLEMENTATION FOR A TWO-PICTURE DEPTH MAP ALGORITHM", application Ser. No. 12/111,548, filed Apr. 29, 2008. The related co-pending applications are assigned to the same assignee as the present application.

FIELD OF INVENTION

This invention relates generally to image acquisition, and more particularly to generating super-resolution images.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2007, Sony Electronics, Incorporated, All Rights Reserved.

BACKGROUND

Super-resolution enhances the resolution of an image. Super-resolution images can be generated from one or more than one low resolution image(s). As is known in the art, a super-resolution image is an image that has a higher resolution (more pixels) and more image detail than the low resolution image(s) used to construct the super-resolution image. A prior art super-resolution approach known in the art iteratively constructs a super-resolution image from a sequence of shifted low resolution images, using the shift positions and blur of each of the low resolution images. The integrity of the shift and blur information is important for the successful construction of a super-resolution image. In many publications in the open literature, these parameters are computed from synthetic data instead of real image data.

SUMMARY

A super-resolution image is generated from a sequence of low resolution images. In one embodiment, the image shift information is measured for each of the low resolution images using an image stabilization component of an imaging device. The shift information is used to generate the super-resolution image. In another embodiment, the blurs are calculated for each of the low resolution images and are used to generate the super-resolution image.

The present invention is described in conjunction with systems, clients, servers, methods, and machine-readable media of varying scope. In addition to the aspects of the present invention described in this summary, further aspects of the invention will become apparent by reference to the drawings and by reading the detailed description that follows.

BRIEF DESCRIPTION OF THE DRAWINGS

The present invention is illustrated by way of example and not limitation in the figures of the accompanying drawings in which like references indicate similar elements.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other differences may be made without departing from the scope of the present invention. The following detailed description is, therefore, not to be taken in a limiting sense, and the scope of the present invention is defined only by the appended claims.

An imaging device iteratively generates a super-resolution image from a sequence of shifted low resolution images. The imaging device can determine the low resolution image shift information by measuring the shake of the image device and/or by shifting the image device sensor during the low resolution image acquisition. Furthermore, the imaging device calculates the blur for each of the acquired low resolution images by convolving, one of the acquired low resolution images into another one. Using the acquired low resolution images, along with the image shift information and the calculated blur, the imaging device iteratively generates the super-resolution image. If the computed super-resolution image is accurate, the representation of the calculated low resolution images will closely match the actual low resolution images captured by the imaging device.

Figure 1:
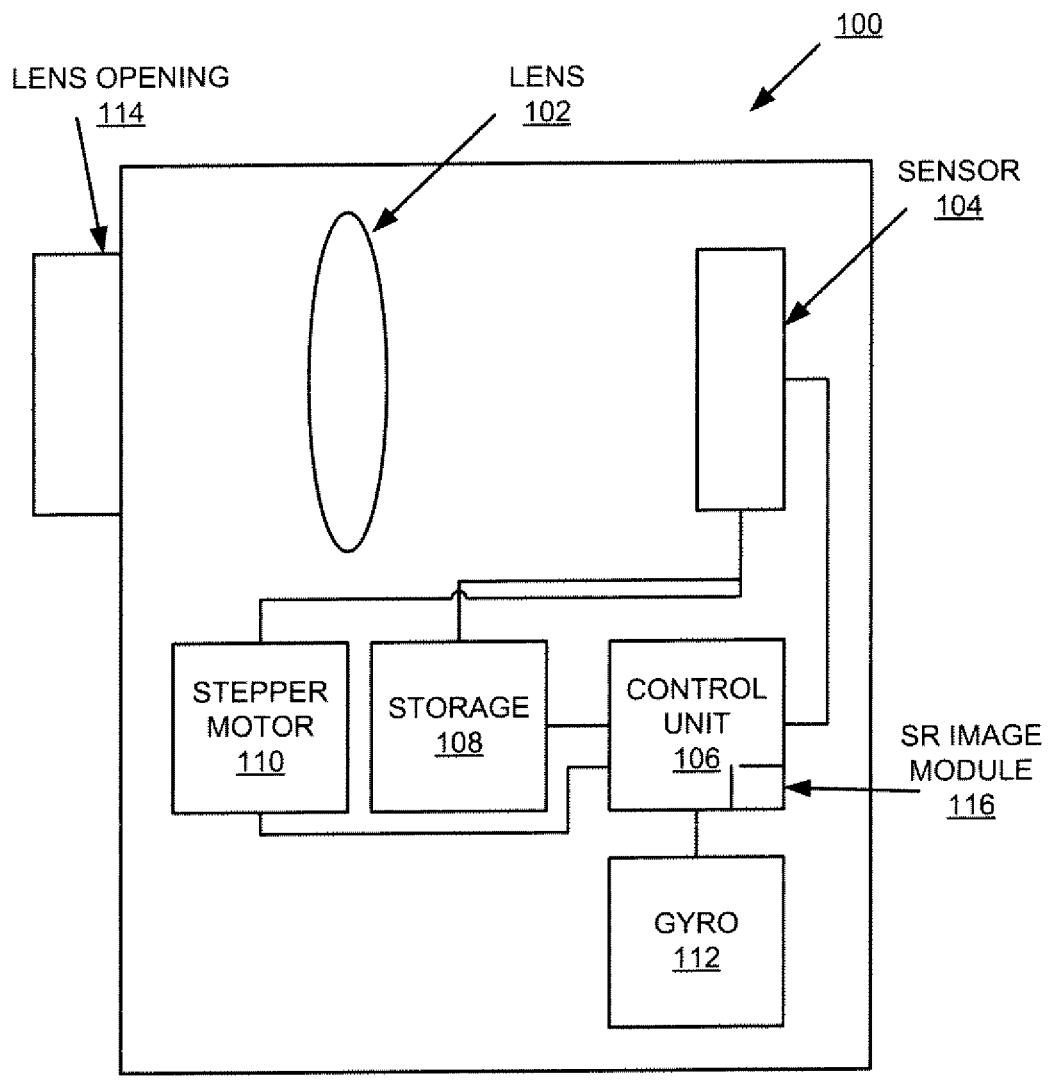
FIG. 1 is a block diagram of one embodiment of an imaging device capable of generating a super-resolution image.

FIG. 1 is a block diagram of one embodiment of imaging system 100 capable of generating a super-resolution image. In FIG. 1, imaging system 100 comprises lens 102, sensor 104, control unit 106, storage 108, stepper motor 110, gyroscopic sensors 112, and lens opening 114. Imaging system 100 can be digital or film still camera, video camera, surveillance camera, robotic vision sensor, image sensor, etc. Sensor 104 captures an image of a scene through lens 102. Sensor 104 can acquire a still picture, such as in a digital or film still camera, or acquire a continuous picture, such as a video or surveillance camera. In addition sensor 104 can acquire the image based on different color models used in the art, such as Red-Green-Blue (RGB), Cyan, Magenta, Yellow, Green (CMYG), etc. Control unit 106 manages the sensor 104 automatically and/or by operator input. Control unit 106 configures the operating parameters of the sensor 104, lens 102, and lens opening 1145 such as, but not limited to, the lens focal length, f the aperture of the lens, A, lens focus position, and (in still cameras) the lens shutter speed. In one embodiment, control unit 106 incorporates a super-resolution image module 116 (shown in phantom) that generates a super-resolution image. In an alternate embodiment, control unit 106 does not contain super-resolution image module 116, but is coupled to super-resolution image module 116. The image (s) acquired by sensor 104 are stored in the image storage 108.

Stepper motor 110 is a set of one or more motors that shift sensor 104 according to instructions from control unit 106. Gyroscopic sensor 112 measures the movement of imaging device 100 as the imaging device acquires an image. As is known of the art, stepper motor 110 and gyroscopic sensor 112 can be used as image stabilization components to stabilize an imaging device during image acquisition. Image stabilization is a technique used to compensate for the amount of imaging device movement, such as human hand shake, that can degrade the quality of the acquired image. One example of image stabilization measures the movement of the imaging device using gyroscopic sensors and compensates for this movement by moving the imaging device sensor using stepper motors as is known in the art. Because both of these components can be used to generate or measure image shift information, stepper motor 110 and gyroscopic sensor 112 can be used to acquire and/or apply image shift information for super-resolution image generation. In one embodiment, control unit 106 instructs stepper motor 110 to shift sensor 104 to support acquiring the low resolution image sequence as described below with reference to FIG. 2, block 202. In one embodiment, gyroscopic sensor 112 senses imaging device 100 shake for each low resolution image acquired by imaging device 100. Gyroscopic sensor 112 forwards the shift information to control unit 106.

Figure 2:
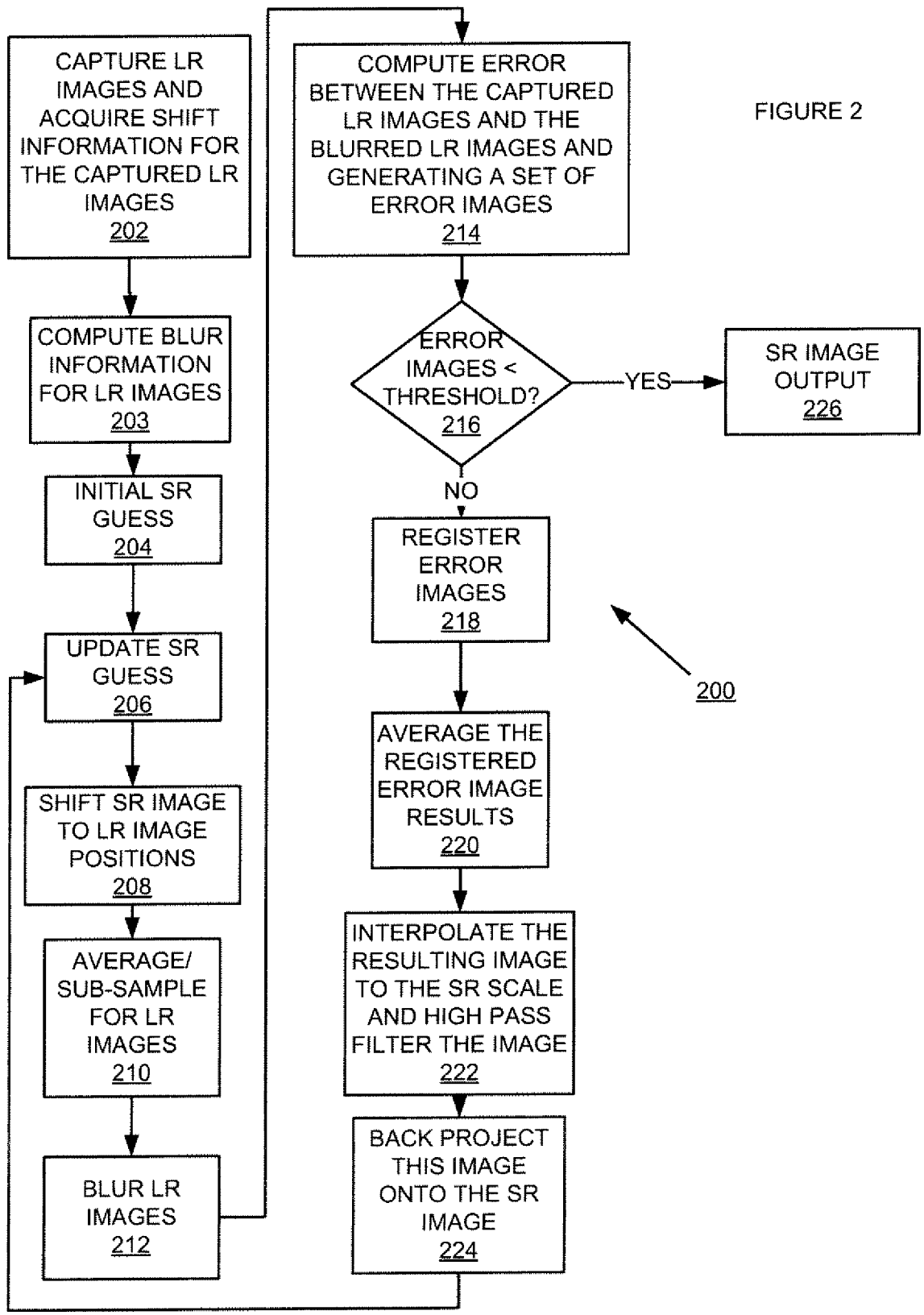
FIG. 2 is a flow diagram of one embodiment of a method that calculates a super-resolution image from several low resolution images using shift measurement information and blur estimation generated from the device acquiring the low resolution images.

FIG. 2 is a flow diagram of one embodiment of a method 200 that calculates a super-resolution image from several low resolution images using shift measurement information and blur estimation information generated from an imaging device that acquired the low resolution images. In one embodiment, super-resolution imaging module 116 of imaging device 100 uses method 200 to generate the super-resolution image from the acquired low resolution images. In FIG. 2, at block 202, method 200 acquires the low resolution images and the images shift information associated with the low resolution images. In one embodiment, method 200 acquires the images using a sensor of an imaging device, such as imaging device 100 as described with reference to FIG. 1. Acquiring the low resolution images and images shift information is further described at FIG. 3 below.

Method 200 calculates the blur information for the different low resolution images at block 203. In one embodiment, because the images are shifted, these images are registered before calculating the blur information. In one embodiment, method 200 computes blur information for the low resolution images at different focus positions. In this embodiment, method 200 calculates the blur information by convolving one of the low resolution images into another of these images using a convolving blur kernel for a pair of images acquired at different focus positions. For example, it four low resolution images are captured, three can be captured at one focus position while the fourth is captured at a different focus position, or two can be captured at one focus position, and another two captured at another focus position, etc. Using this change in blur information between two pictures, the depth information can then be computed. This is further described in the co-pending U.S. patent application, entitled "METHOD AND APPARATUS FOR GENERATING A DEPTH MAP UTILIZED IN AUTOFOCUSING", application Ser. No. 11/473, 694. Once the depth information is obtained, the absolute blur can be estimated using a simple lens model.

In one embodiment, method 200 computes the absolute blur from the depth information using Equation (1):

$$d\_o = \frac{f*D}{D - f - f_{number} * 2r} \quad (1)$$

where d_o is the depth information, f is the lens focal length, D is the distance between the image plane inside the camera and the lens, r is the blur radius of the image on the image plane, and $f_{number}$ is the $f_{number}$ of the lens. Since d_o is determined above, and f, D, and $f_{number}$ are known, the blur radius, r, is the unknown in Equation (1). Solving for r yields the absolute blur information for the specific low resolution image.

At block 204, method 200 generates an initial guess of the super-resolution image. In one embodiment, method 200 interpolates the resulting low resolution images onto fixed, finer grids. These interpolated images are registered, using the acquired shift information. The registered images are averaged, generating the initial guess of the super-resolution image. In another embodiment, method 200 interpolates one of the captured LR images onto a fixed, finer grid. This image is shifted, using the acquired shift information. It is used as the super-resolution image guess. Alternatively, the initial guess for the super-resolution image can also be obtained by generating an image consisting of random noise, using a fixed, finer grid.

Given the shift information and the captured LR images from block 202, the blur information between two different LR images (corresponding to different lens focus positions) and the initial SR guess from block 204, a model is created for the LR image generation process. If the blur and shift information used in the model are accurate and the SR (guess is correct, this model will produce a sequence of computed LR images that closely resemble the captured LR images.

The sequence of computed LR images is computed in the following manner. At block 208, method 200 shifts the super-resolution image to the LR image positions using the shift information obtained at block 202 above. In one embodiment, method 200 shifts these images in the x and/or y direction and/or by rotating the image.

Method 200 averages and sub-samples the shifted super-resolution images at block 210. For example, if the resolution enhancement is a factor of two, non-overlapping 2×2 blocks are averaged and stored in an array. At block 212, method 200 then blurs each of the averaged and sub-sampled images produced by block 210. In one embodiment, method 200 uses the blur information from block 203.

Method 200 computes the error between the captured LIZ images and the blurred LR images at block 214. This generates a set of error images in block 214. Initially, the error between the computed LR images from the model and the captured LR images from the camera will not be small or negligible. This is especially true, if the initial SR guess from block 204 is an image consisting of random noise.

At block 216, method 200 determines if the super resolution image is converged. If the error images are less than some predefined threshold, the computed SR image is very close to the true SR image. The process is then deemed to have converted, and the SR image is Output in block 226.

If the error images are greater than some predefined threshold in block 216, method 200 uses the error images to update the SR guess at blocks 218-224. Method 200 registers the error images at block 218. At block 220, method 200 computes the average, resulting in a single output image. At block 222, method 200 interpolates this output image to the SR image scale and enhances this image via a filter. The resulting information is the used to update the original SR image via back projection. That is, the error is used to update the current SR guess. The SR image is then updated in block 206 using the image resulting from block 224 and the process repeats.

At block 216, method 200 determines if convergence has occurred. In one embodiment, method 200 determines this convergence by comparing the acquired low resolution images with the computed low resolution images. In one embodiment, method 200 compares the two sets of images and determines if these sets of images differ by less than a threshold. This is given by Equation (2).

$$E(SR) = \sum_{n=1}^{k} \|T^{(n)}(SR) - (LR)^{(n)}\|^2 \quad (2)$$

where E(SR) is error; T is an operator that denotes blurring, shifting, and sub-sampling; and $(LR)^{(n)}$ represents the captured sequence of low resolution images given by block 202; $T^{(n)}$ (SR) are the respective predicted sequence of low resolution images obtained by applying blocks 208, 210 and 212 to the SR image in block 206; and n denotes the set of predicted low resolution images after the nth pass/iteration of the loop. If E(SR) is less than the pre-defined threshold, method 200 has converged and method 200 proceeds to block 226. In another embodiment, a non-cumulative threshold can also be applied.

Because method 200 determines low resolution image shift and blur information from the acquired low resolution images, method 200 can be used by an imaging device that produces the low resolution images. In one embodiment, method 200 acquires the shift information from the image stabilization components of the imaging device. As described above with reference to FIG. 1, gyroscopic sensors 112 measures imaging device 100 shake and stepper motor 110 can move sensor 104 to compensate for this motion. By using either the gyroscopic sensors or the stepper motors, method 200 can acquire and/or apply image shift information to the sequence of low resolution images.

Figure 3:
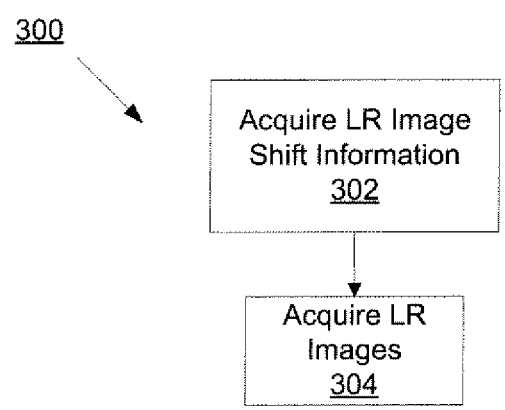
FIG. 3 is a flow diagram of one embodiment of a method that acquires low resolution images and shift information.

As described above, method 200 acquires the low resolution images and image shift information at FIG. 2, block 202. FIG. 3 is a flow diagram of one embodiment of a method 300 that represents the processing of FIG. 2, block 202. At block 302, method 300 acquires the low resolution shift image information. In one embodiment, method 300 acquires low resolution image shift information by the measuring the shake in the imaging device using the gyroscopic sensors, such as gyroscopic sensor 112 in FIG. 1. For example, method 300 measures the imaging device movement when the imaging device is not attached to a tripod. In this embodiment, each acquisition of a different low resolution image results in a different position for the imaging device due to the imaging device shake. The gyroscopic sensors measure the motion of the imaging device. Method 300 records each of the different positions of the low resolution image based on measurement of the gyroscopic sensors.

In another embodiment, method 300 instructs the stepper motors of the image stabilization system to move the sensor to a different position for each acquired low resolution image, such as stepper motor 110 in FIG. 1. In this embodiment, the stepper motors move the sensor in the x and/or y direction to set a different position for each different low resolution image. This embodiment can be used when there is little or no movement in the imaging device during the image acquisition, such as having the imaging device attached to a tripod. In an alternative embodiment, method 300 determines the image shift information by making use of the information from both of the embodiments just described.

Figure 4:
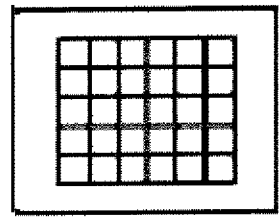
FIG. 4 is an example of a sequence of low resolution images used in the flow diagram of FIG. 3.
Figure 4:
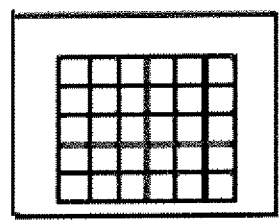
Figure 4:
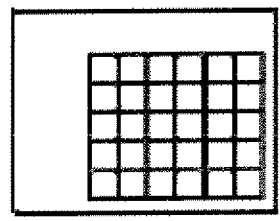
Figure 4:
Figure 4:
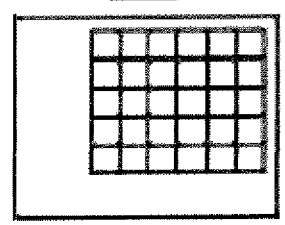

At block 304, method 300 acquires a sequence of low resolution images. In one embodiment, the low resolution images in this sequence overlap one another. FIG. 4 is an example of the low resolution image sequence 400 acquired in FIG. 3. In FIG. 4, low resolution image sequence 400 comprises low resolution images 402A-N. In one embodiment, method 300 acquires, each low resolution image 402A-N at different sensor positions. For example method 300 acquires low resolution image 402A at sensor position (x,y), and further acquires low resolution images 402B-N at sensor positions (x+\delta x, y), . . . , (x+\delta N, y+\deltaN), respectively. These sensor positions correspond to the low resolution image positions used to construct the super-resolution image.

Furthermore, in one embodiment, method 300 acquires the low resolution images 402A-N at different focus positions. Images at different focus positions can have different blur. Method 300 can acquire low resolution images at two or more different focus positions. For example, method 300 acquires low resolution image 402A at focus position B1 and low resolution images 402B-N at positions B2. Method 300 uses the different focus positions to calculate the blur for low resolution images 402A-N. Calculating the low resolution image blur is further described with reference to FIG. 2 at block 203.

Figure 5:
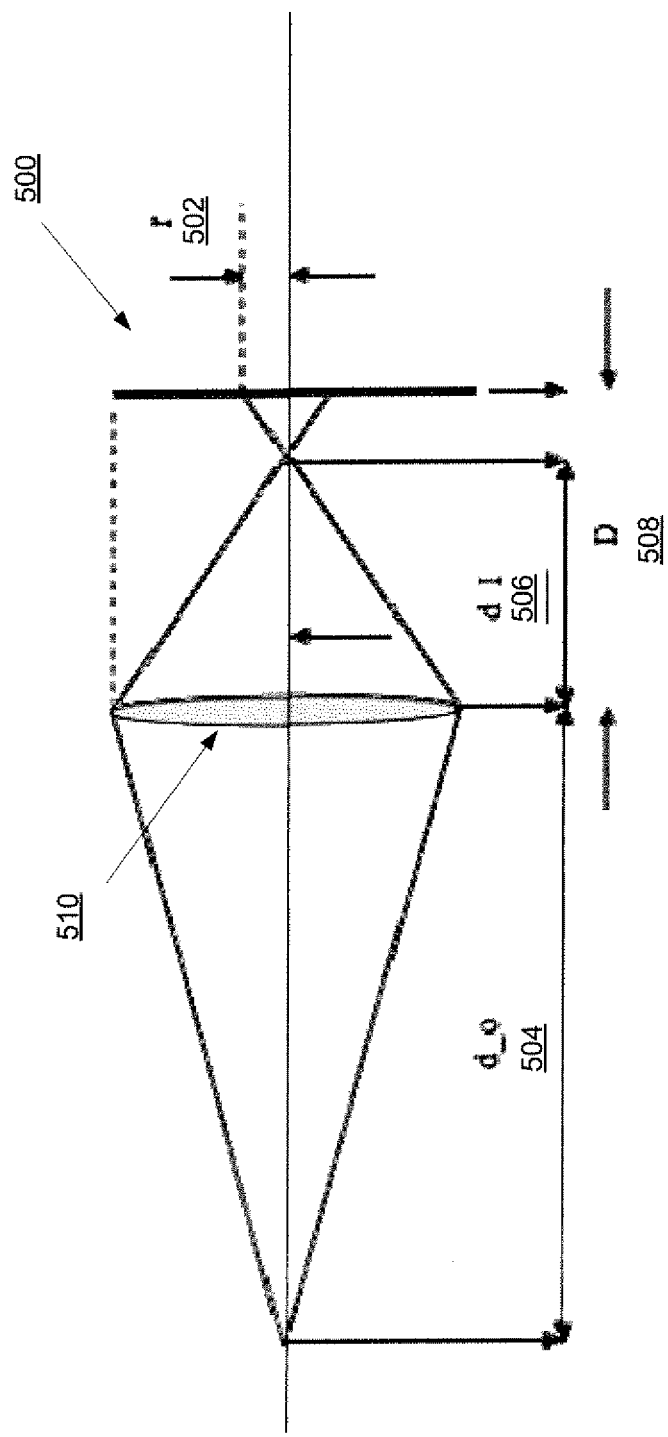
FIG. 5 is a block diagram illustrating one embodiment of an optics setting used to capture a low resolution image.

In this embodiment, method 300 acquires the low resolution images at different focus positions. FIG. 5 illustrates one embodiment of an optics setting 500 used to capture one of the low resolution images. In FIG. 5, optics settings 500 of lens 102 comprises blur radius, r, 502; focus distance, d_o, 504; distance between lens 102 and a properly focused point image, d_l 506; and focus, D, 508. In addition and in one embodiment, method 300 acquires each low resolution image 402A-N at the same zoom position.

Figure 6:
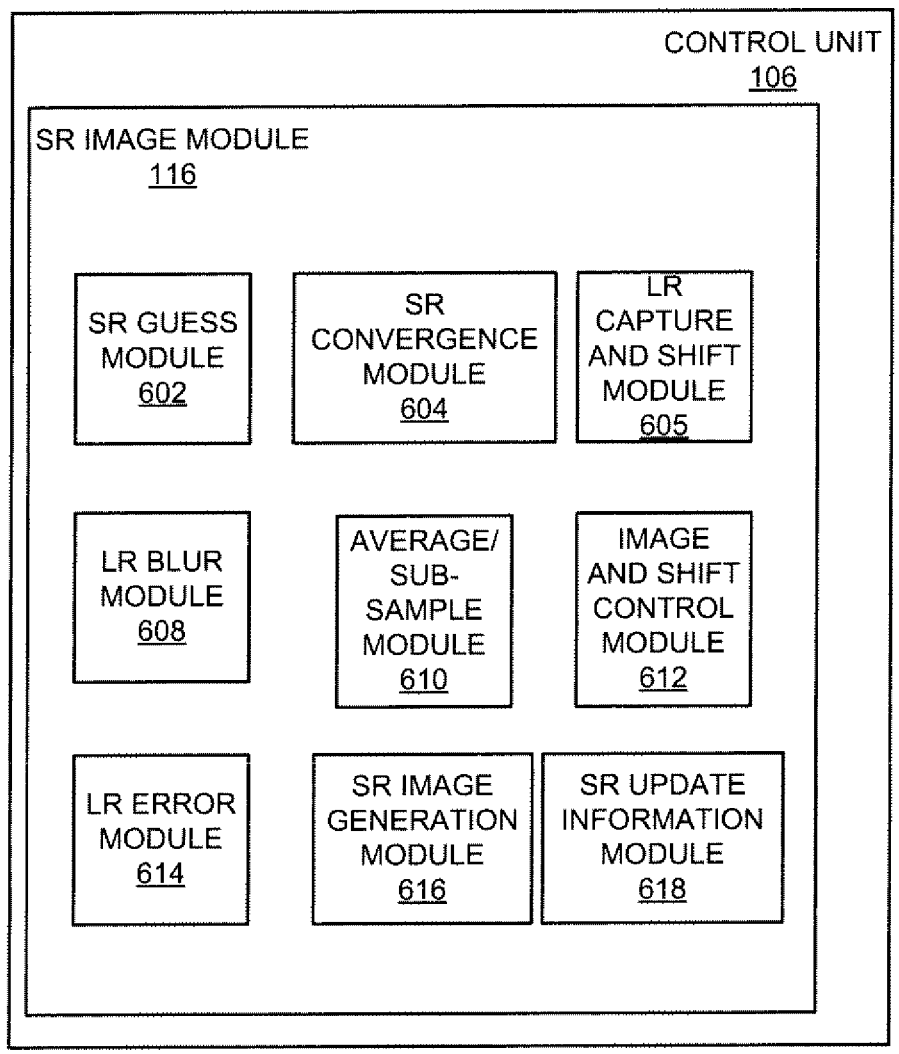
FIG. 6 is a block diagram illustrating one embodiment of an image device control unit that includes a super-resolution generation unit.

As described above, imaging device 100 includes control unit 106 and super-resolution image module 116 that can be used to generate a super-resolution image using method 200. FIG. 6 is a diagram illustrating one embodiment of control unit 106 that includes a super-resolution image module 116. Super-resolution image module 116 comprises super-resolution guess module 602, super-resolution convergence module 604, low resolution capture and shift module 605, low resolution blur module 608, average/sub-sample module 610, low resolution image and shift control module 612, low resolution error module 614, super-resolution image generation module 616, and super-resolution update information module 618. Super-resolution guess module 602 generates the initial super-resolution guess image as described with reference to FIG. 2, block 204. Super-resolution convergence module 604 determines if the super-resolution has converged as described with reference to FIG. 2, block 216. Low resolution capture and shift module 605, captures the LR images and determines the associated shift information, as described in FIG. 2, block 202. Low resolution blur module 608 computes the blur information for the low resolution images as described with reference to FIG. 2, block 212. Average/sub-sample modules 610 averages and sub-samples the generated super-resolution image as described with reference to FIG. 2, block 210. Low resolution image and shift control module instructs the control unit 106 to acquire the low resolution images and the corresponding shift information as described with reference to FIG. 2, block 208. Low resolution error module 614 generates the error between the predicted low resolution images as described with reference to FIG. 2, block 212 and the captured LR images from block 202. Super-resolution generation module 616 generates an updated super-resolution image using optimization and image back projection as described with reference to FIG. 2, block 224. Super-resolution update information nodule 618 performs the steps in blocks 218, 220 and 222, to produce an image that is used to update the SR guess via the back projection block, 224.

Figure 7A:
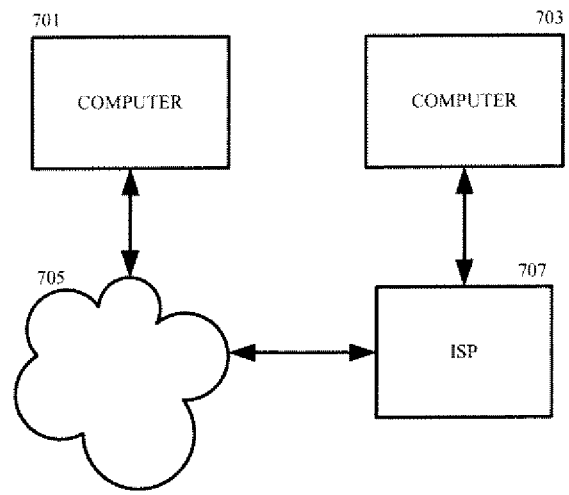
FIGS. 7A and 7B are diagrams of a computer environment suitable for practicing the invention.

In one embodiment, as shown in FIG. 7A, a server computer 701 is coupled to, and provides data through, the Internet 705. A client computer 703 is coupled to the Internet 705 through an ISP (Internet Service Provider) 705 and executes a conventional Internet browsing application to exchange data with the server 701. In one embodiment, client 703 and/or server 705 can control the generation of a super-resolution image of a coupled imaging device using method 300 described in FIG. 2. Optionally, the server 701 can be part of an ISP which provides access to the Internet for client systems. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet allows users of client computer systems to exchange information receive and send c-mails, view documents, such as documents which have been prepared in the HTML format, and receive content. It is readily apparent that the present invention is not limited to Internet access and Internet web-based sites; directly coupled and private networks are also contemplated.

Figure 7B:
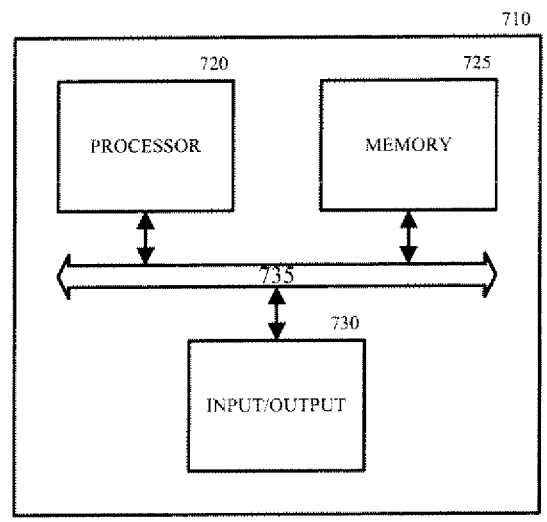
Figure 8:
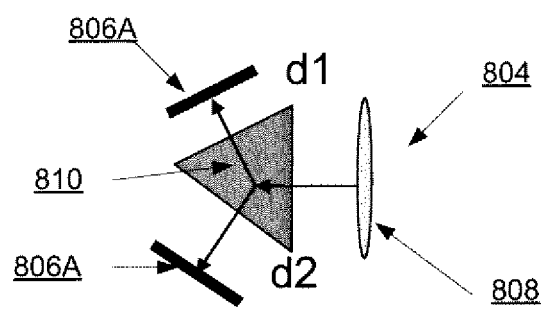
FIG. 8 is a block diagram illustrating one embodiment of an imaging system 804 that includes two imaging sensors 806AB at different focusing distances (d1, d2) from lens 808 through splitter 810.

One embodiment of a computer system suitable for use as server 701 is illustrated in FIG. 7B. The computer system 710, includes a processor 720, memory 725 and input/output capability 730 coupled to a system bus 735. The memory 725 is configured to store instructions which, when executed by the processor 720, perform the methods described herein. The memory 725 may also store data for a super-resolution generation mechanism. Input/output 730 provides for the delivery and display of the data for a super-resolution image generation mechanism or portions or representations thereof, and also the input of data of various types for storage, processing or display. Input/output 730 also encompasses various types of machine-readable media, including any type of storage device that is accessible by the processor 720. One of skill in the art will immediately recognize that the server 701 is controlled by operating system software executing in memory 725. Input/output 730 and related media store the machine-executable instructions for the operating system and methods of the present invention as well as the data for super-resolution image generation.

The description of FIGS. 7A-B is intended to provide an overview of computer hardware and other operating components suitable for implementing the invention, but is not intended to limit the applicable environments. It will be appreciated that the computer system 740 is one example of many possible computer systems which have different architectures. A typical computer system will usually include at least a processor, memory, and a bus coupling the memory to the processor. One of skill in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computerized method comprising:
    acquiring a plurality of low resolution images, wherein the plurality of acquired low resolution images is acquired at different focus positions;
    calculating a blur for each of the plurality of acquired low resolution images using a blur difference between different ones of the plurality of acquired low resolution images; and
    generating a super-resolution image from the plurality of acquired low resolution images and the calculated blurs.

2. The computerized method of claim 1, further comprising:
    calculating a blur difference between a pair of the plurality of acquired low resolution images.

3. The computerized method of claim 2, wherein the calculating the blur difference further comprising convolving one image of the image pair with a blur kernel.

4. The computerized method of claim 2, further comprising:
    re-registering one image of the pair so the image pair has the same shift position.

5. The computerized method of claim 1, wherein the generating the super-resolution image comprises:
    generating an initial guess of the super-resolution image by interpolating each of the plurality of low resolution images onto a finer grid.

6. The computerized method of claim 1, wherein the generating the super-resolution image comprises:
    iteratively computing the super-resolution image by,
        computing a plurality of approximation low resolution images using a previous candidate super-resolution image,
        computing a plurality of error images based on the difference between the plurality of approximation low resolution images and the plurality of low resolution images, and
        computing a new candidate super-resolution from the plurality of error images and the previous candidate super-resolution image.

7. The computerized method of claim 6, wherein if one of more of the plurality of error images are less than a threshold, the iteratively computing of the super-resolution image has converged.

8. A non-transitory machine readable medium having executable instructions to cause a processor to perform a method comprising:

acquiring a plurality of low resolution images, wherein the plurality of acquired low resolution images is acquired at different focus positions;

calculating a blur for each of the plurality of acquired low resolution images using a blur difference between different ones of the plurality of acquired low resolution images; and generating a super-resolution image from the plurality of acquired low resolution images and the calculated blurs.

9. The non-transitory machine readable medium of claim 8, further comprising:

calculating a blur difference between a pair of the plurality of acquired low resolution images.

10. The non-transitory machine readable medium of claim 9, wherein the calculating the blur difference further comprising convolving one image of the image pair with a blur kernel.

11. The non-transitory machine readable medium of claim 8, further comprising:

re-registering one image of the pair so the image pair has the same shift position.

12. The non-transitory machine readable medium of claim 8, wherein the generating the super-resolution image comprises:

generating an initial guess of the super-resolution image by interpolating each of the plurality of low resolution images onto a finer grid.

13. The non-transitory machine readable medium of claim 8, wherein the generating the super-resolution image comprises:

iteratively computing the super-resolution image by,
computing a plurality of approximation low resolution images using a previous candidate super-resolution image,
computing a plurality of error images based on the difference between the plurality of approximation low resolution images and the plurality of low resolution images, and
computing a new candidate super-resolution from the plurality of error images and the previous candidate super-resolution image.

14. The non-transitory machine readable medium of claim 13, wherein if one of more of the plurality of error images are less than a threshold, the iteratively computing of the super-resolution image has converged.

15. A system comprising:
a processor;
a memory coupled to the processor though a bus; and
a process executed from the memory by the processor to cause the processor to acquire a plurality of low resolution images, wherein the plurality of acquired low resolution images is acquired at different focus positions, calculate a blur for each of the plurality of acquired low resolution images using a blur difference between different ones of the acquired plurality of low resolution images and to generate a super-resolution image from the acquired plurality of low resolution images and the calculated blurs.

16. The system of claim 15, wherein the process further causes the processor to calculate a blur difference between a pair of the plurality of acquired low resolution images.

17. The system of claim 16, wherein a process to calculate of the blur difference causes the processor to convolve one image of the image pair with a blur kernel.

18. The system of claim 16, wherein the process further causes the processor to re-registering one image of the pair so the image pair has the same shift position.

19. The system of claim 15, wherein the process further causes the processor to generate an initial guess of the super-resolution image by interpolating each of the plurality of low resolution images onto a finer grid.

20. The system of claim 19, wherein the process further causes the processor to iteratively compute the super-resolution image, wherein a process to iteratively compute the super-resolution image causes the processor to compute a plurality of approximation low resolution images using a previous candidate super-resolution image, to compute a plurality of error images based on the difference between the plurality of approximation low resolution images and the plurality of low resolution images, and to compute a new candidate super-resolution from the plurality of error images and the previous candidate super-resolution image.

* * * * *